United States Patent
Chin et al.

(10) Patent No.: US 10,887,131 B1
(45) Date of Patent: Jan. 5, 2021

(54) HIGH AVAILABILITY (HA) NETWORK DEVICE

(71) Applicant: Riverbed Technology, Inc., San Francisco, CA (US)

(72) Inventors: Bill Y. Chin, Sunnyvale, CA (US); Alfred Jörg Ammann, Wettingen (CH)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 16/203,973

(22) Filed: Nov. 29, 2018

Related U.S. Application Data

(60) Provisional application No. 62/592,292, filed on Nov. 29, 2017.

(51) Int. Cl.
| | | |
|---|---|---|
| *H04L 12/58* | (2006.01) | |
| *H04L 12/46* | (2006.01) | |
| *H04L 12/931* | (2013.01) | |
| *H04L 12/911* | (2013.01) | |
| *H04L 12/66* | (2006.01) | |

(52) U.S. Cl.
CPC ...... *H04L 12/4645* (2013.01); *H04L 12/4695* (2013.01); *H04L 12/66* (2013.01); *H04L 47/746* (2013.01); *H04L 49/354* (2013.01)

(58) Field of Classification Search
CPC ... H04L 63/08; H04L 63/306; H04L 63/0281; H04L 45/72; H04L 49/70; H04L 12/2424; H04L 41/0803; H04L 41/0823; H04L 41/0806; H04L 41/0893; H04L 41/0813; H04L 41/0889; H04L 61/2517; H04L 61/2521; H04L 61/256; H04L 67/1008; H04L 45/74; H04L 63/0218; H04L 63/18; H04L 63/16; H04L 63/162; H04L 63/164; H04L 63/166; H04L 63/168; G06F 9/45533; G06F 9/455; G06F 15/177
USPC .......... 370/216, 244, 395, 401, 392
See application file for complete search history.

(56) References Cited

U.S. PATENT DOCUMENTS

| | | | | |
|---|---|---|---|---|
| 6,035,105 | A * | 3/2000 | McCloghrie ........ | H04L 12/4645 370/351 |
| 6,219,699 | B1 * | 4/2001 | McCloghrie ........ | H04L 12/4645 370/351 |
| 7,453,888 | B2 * | 11/2008 | Zabihi ................. | H04L 12/4641 370/400 |
| 7,496,955 | B2 * | 2/2009 | Akundi ................ | H04L 45/308 370/392 |
| 7,873,060 | B2 * | 1/2011 | Luo ..................... | H04L 12/4633 370/401 |
| 8,018,866 | B1 * | 9/2011 | Kasturi .................. | H04L 47/17 370/252 |
| 8,782,395 | B1 * | 7/2014 | Ly ......................... | H04W 76/11 713/153 |

(Continued)

*Primary Examiner* — Man U Phan
(74) *Attorney, Agent, or Firm* — Park, Vaughan, Fleming & Dowler LLP; Laxman Sahasrabuddhe

(57) ABSTRACT

Some embodiments described herein provide a combination of a layer 3 (L3) hop with layer 2 (L2) bypass/fail-to-wire in a network device. Specifically, some embodiments place the network device between two routers, thereby becoming a L3 hop between the two routers. The existing route between the two routers is preserved by using L2 bypass through the network device. If the network device fails, then the physical fail-to-wire will be engaged, removing its L3 hop, but preserving the L2 bypass.

15 Claims, 6 Drawing Sheets

Configure a first VLAN trunk port to handle network traffic having a first VLAN tag or a second VLAN tag, wherein the first VLAN tag corresponds to a first VLAN that includes a first router and a second router, but does not include the network device, and wherein the second VLAN tag corresponds to a second VLAN that includes the first router and the network device — 502

Configure a second VLAN trunk port to handle network traffic having the first VLAN tag or a third VLAN tag, wherein the first VLAN tag corresponds to the first VLAN, and wherein the third VLAN tag corresponds to a third VLAN that includes the second router and the network device — 504

Upon detecting a power failure in the network device, directly communicate network traffic between the first VLAN trunk port and the second VLAN trunk port — 506

(56) References Cited

U.S. PATENT DOCUMENTS

| | | | |
|---|---|---|---|
| 9,172,603 B2* | 10/2015 | Padmanabhan | H04L 49/70 |
| 9,219,698 B2* | 12/2015 | Wang | H04L 49/354 |
| 9,979,696 B2* | 5/2018 | Cachin | H04L 63/162 |
| 10,476,699 B2* | 11/2019 | Sudhakaran | H04L 41/0806 |
| 2004/0044754 A1* | 3/2004 | Virdy | H04L 41/5054 |
| | | | 709/223 |

* cited by examiner

HIGH AVAILABILITY (HA) NETWORK DEVICE

RELATED APPLICATION

This application claims benefit of U.S. Provisional Patent Application No. 62/592,292, entitled "STEELCONNECT SINGLE BOX HIGH AVAILABILITY (HA)," by the same inventors, filed on 29 Nov. 2017, the contents of which are herein incorporated by reference in their entirety for all purposes.

BACKGROUND

The present disclosure generally relates to high availability (HA) networking equipment. More specifically, the present disclosure relates to techniques and systems for implementing HA in a network device.

The emergence of software-defined wide-area-network (SD-WAN) technology promises to simplify networking so that end-users can focus on their business critical applications, and not worry about their underlying network. An SD-WAN gateway is required to be a layer 3 (L3) hop for full functionality. Existing HA deployments that include SD-WAN gateways can be complex.

Therefore, what are needed are HA deployments that include SD-WAN gateways without the above-mentioned drawbacks.

SUMMARY

Some embodiments described in this disclosure feature a HA network device. Specifically, in some embodiments, the network device comprises a first virtual local area network (VLAN) trunk port that is coupled to a first router, and a second VLAN trunk port that is coupled to a second router. The first VLAN trunk port can be configured to handle traffic having a first VLAN tag or a second VLAN tag, wherein the first VLAN tag corresponds to a first VLAN that includes the first router and the second router, but does not include the network device, and wherein the second VLAN tag corresponds to a second VLAN that includes the first router and the network device. The second VLAN trunk port can be configured to handle traffic having the first VLAN tag or a third VLAN tag, wherein the first VLAN tag corresponds to the first VLAN that includes the first router and the second router, but does not include the network device, and wherein the third VLAN tag corresponds to a third VLAN that includes the second router and the network device. The network device can also comprise a fail-to-wire circuit which, upon detection of a power failure in the network device, directly communicates network traffic between the first VLAN trunk port and the second VLAN trunk port.

In some embodiments, the network device further comprises a processor, and a non-transitory storage medium that stores processor-executable instructions for: a routing module to route the second VLAN network traffic; a wide area network (WAN) optimization module to optimize the second VLAN network traffic; a virtual switch module to provide virtual ports for communicating the second VLAN network traffic between different modules in the network device; and a controller module to (1) detect a critical software failure in the routing module and/or the WAN optimization module, and (2) configure the virtual switch module upon detecting the critical software failure.

In some embodiments, the virtual switch module is configured so that the network traffic is processed by the routing module and the WAN optimization module during normal operation.

In some embodiments, upon detecting a critical software failure in the routing module, the controller module configures the virtual switch module to bypass the routing module.

In some embodiments, upon detecting a critical software failure in the WAN optimization module, the controller module configures the virtual switch module to bypass the WAN optimization module.

In some embodiments, upon detecting critical software failures in both the routing module and the WAN optimization module, the controller module configures the virtual switch module to bypass the routing module and the WAN optimization module.

DETAILED DESCRIPTION

Figure 1A:
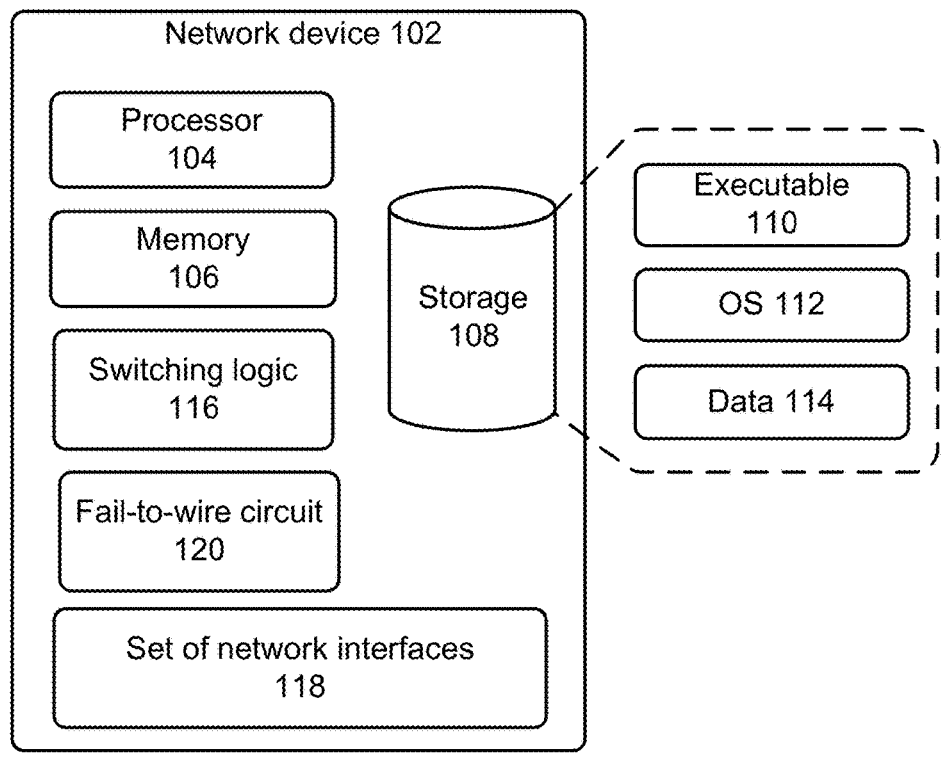
FIG. 1A illustrates a network device in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices for sending, receiving, directing, and optimizing network data traffic.

Communication between two nodes of a network is typically accomplished by using a layered software architecture, which is often referred to as a networking software stack or simply a networking stack. A given functionality in a networking stack can be implemented using hardware or software or a combination thereof. The decision to implement a specific functionality in hardware or software is typically based on a tradeoff between performance and cost.

Each layer is usually associated with one or more protocols which define the rules and conventions for processing packets in that layer. Each lower layer performs a service for the layer immediately above it to help with processing packets, and each layer typically adds a header (control data) that allows peer layers to communicate with one another. At the sender, this process of adding layer specific headers is usually performed at each layer as the payload moves from higher layers to lower layers. The receiving host generally performs the reverse of this process by processing headers of each layer as the payload moves from the lowest layer to the highest layer.

A physical layer (also known as layer 1 or L1) can be defined as a layer that sends and receives electrical or electromagnetic signals over a communication medium (e.g., the "PHY" circuit that sends and receives signals over a communication medium). A data link layer (also known as link layer, layer 2, or L2) can be defined as a layer that manages a communication channel between adjacent communication devices. For example, if two routers are connected to each other via a cable, then the link layer would typically manage the communication channel between these two routers. The Ethernet layer is an example of a link layer. A network layer (also known as layer 3 or L3) can be defined as a layer that enables communication between any two devices across the network. The Internet Protocol (IP) layer is an example of a network layer that enables communication between two routers in an IP network.

Existing enterprise customers looking to use SD-WAN want the ability to easily fall back to their original network configuration if an issue is encountered while using SD-WAN. One existing solution involves coexisting with the customer edge (CE) router in Virtual Router Redundancy Protocol (VRRP) mode. This is a workable solution, but if there are multiple CE routers or if the WAN provider owns the CE routers, then the HA deployments become quite complex. Existing inline layer 2 (L2) bypass/fail-to-wire solutions don't allow the SD-WAN gateway to be a L3 hop. This limits the ability to properly manage edge routing and path selection.

Some embodiments described herein provide a combination of a L3 hop with L2 bypass/fail-to-wire in a single network device. Specifically, some embodiments place the SD-WAN gateway between the CE and LAN side routers. In this configuration, the SD-WAN gateway becomes a L3 hop between the CE and LAN routers advertising a lower administrative distance. The existing route between the CE and LAN router is preserved by using L2 bypass through the SD-WAN gateway. If the SD-WAN gateway fails, then the physical fail-to-wire will be engaged, removing its L3 hop, but preserving the L2 bypass. These embodiments enable customers to deploy SD-WAN in their networks and achieve HA by falling back to their existing network configuration using a single network device. Also, the embodiments described herein require minimal changes to the customer network to connect the SD-WAN gateway.

FIG. 1A illustrates a network device in accordance with some embodiments described herein. Network device 102 (e.g., an SD-WAN gateway) comprises processor 104, memory 106 (e.g., a volatile or non-volatile random access memory), and storage 108 (e.g., a flash memory device or a disk drive). Storage 108 can store executable 110, operating system 112, and data 114. The components in network device 102 can communicate with one another using a communication mechanism, e.g., a bus, a backplane, and/or a switching fabric. Executable 110 can include instructions that, when executed by processor 104, cause network device 102 to perform one or more methods that are implicitly or explicitly described in this disclosure. Data 114 can include any data that is inputted into or outputted by executable 110.

Network device 102 can also include switching logic 116, set of network interfaces 118, and fail-to-wire circuit 120. Set of network interfaces 118 can be used to transmit data to and/or receive data from other communication devices. Specifically, set of network interfaces 118 can include multiple VLAN trunk ports. Switching logic 116 can forward network traffic received on one or more network interfaces in accordance with switching/forwarding/routing information stored in network device 102. Specifically, switching logic 116 can be configured by processor 104 in accordance with one or more methods that are implicitly or explicitly described in this disclosure.

Figure 1B:
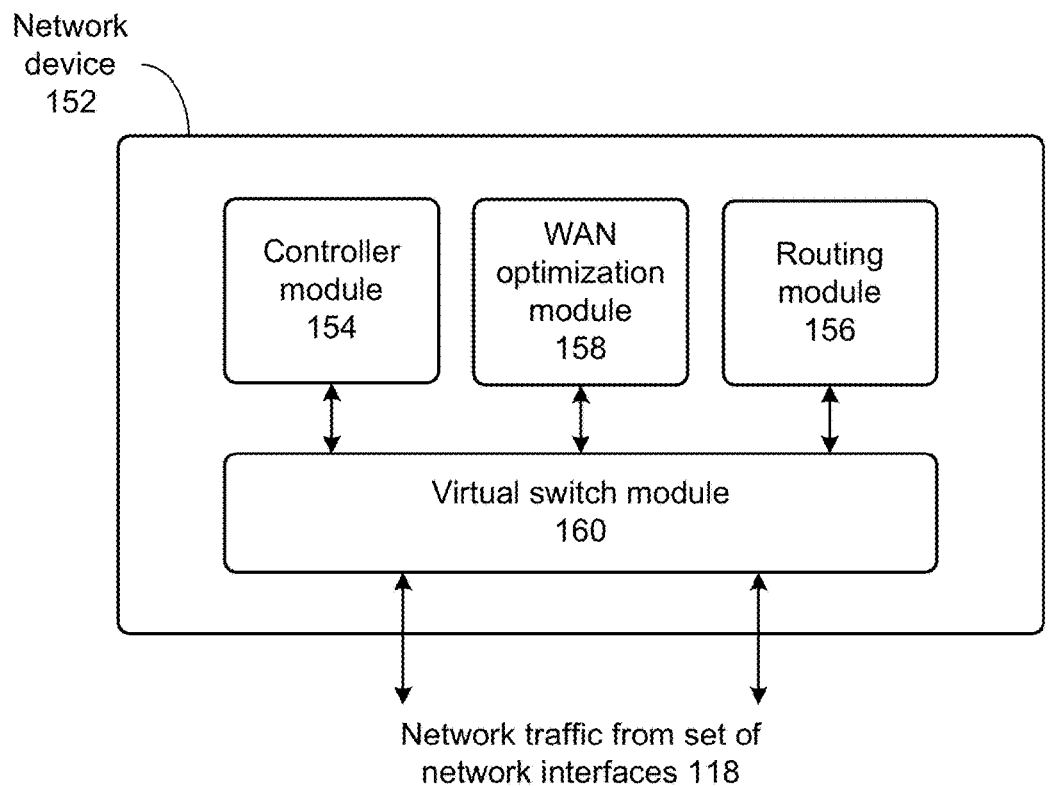
FIG. 1B illustrates a logical view of a network device in accordance with some embodiments described herein.

FIG. 1B illustrates a logical view of a network device in accordance with some embodiments described herein. Network device 152 can include routing module 156 to route network traffic, WAN optimization module 158 to optimize network traffic, and virtual switch module 160 to provide virtual ports for communicating network traffic between different modules in the network device, and to send/receive network traffic from set of network interfaces 118. Network device 152 can also include controller module 154 to (1) detect a critical software failure in routing module 156 and/or WAN optimization module 158, and (2) reconfigure virtual switch module 160 upon detecting the critical software failure.

Figure 2:
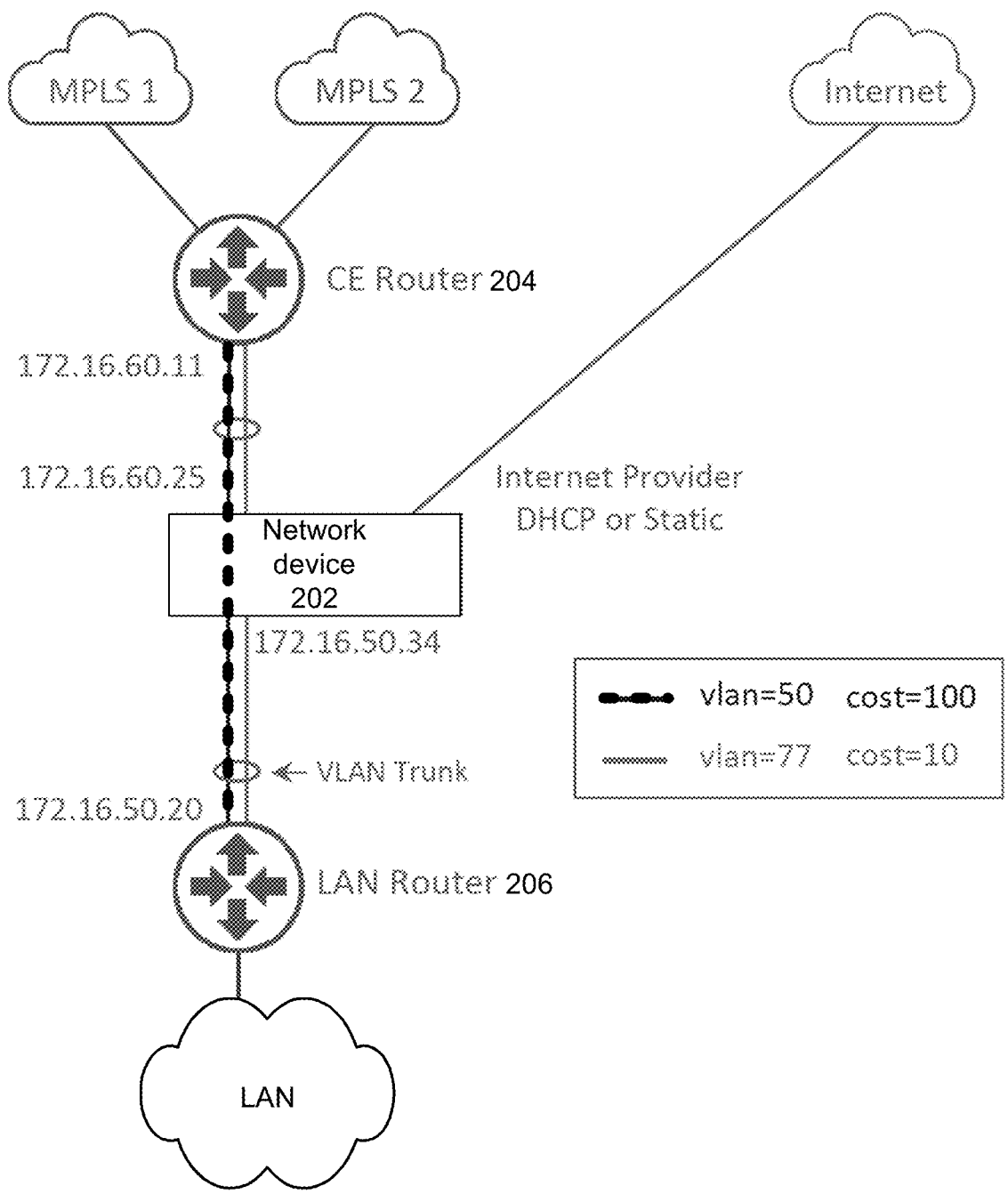
FIG. 2 illustrates a HA network device in accordance with some embodiments described herein.

FIG. 2 illustrates a HA network device in accordance with some embodiments described herein. Network device 202 is coupled with a first router, e.g., CE router 204, using a first VLAN trunk port, and is coupled with a second router, e.g., LAN router 206, with a second VLAN trunk port. Both VLAN trunk ports handle traffic having VLAN tags 50 or 77. VLAN tag 50 corresponds to a first VLAN that includes CE router 204 and LAN router 206, but does not include network device 202. VLAN tag 77 corresponds to a second VLAN that includes CE router 204 and network device 202. VLAN tag 77 also corresponds to a third VLAN that includes LAN router 206 and network device 202. In the example shown in FIG. 2, the same VLAN tag was used for the second VLAN and the third VLAN. However, in general, the second VLAN and the third VLAN can use different VLAN tags.

During normal operation, a cost metric for the first VLAN (i.e., the VLAN that includes CE router 204 and LAN router 206) is set to a greater value (a cost of 100 is shown in FIG. 2 for VLAN tag 50) than the cost metric of the second and third VLANs (a cost of 10 is shown in FIG. 2 for VLAN tag 77). This causes network traffic to be routed over the second and third VLANs, thereby enabling network device 202 to provide L3 routing capabilities (i.e., network device 202 is an L3 next-hop for CE router 204 and LAN router 206).

If a failure is detected in network device 202, then a fail-to-wire circuit in network device 202 can start directly communicating network traffic between the two VLAN trunk ports, thereby bypassing any layer 2 or above processing on network device 202. In this disclosure, the phrase "directly communicating network traffic between the two VLAN trunk ports" means communicating data between the two VLAN trunk ports at the physical layer without performing any data link layer, network layer, or any other higher layer processing on the data (i.e., data received on the first VLAN port is directly transmitted on the second VLAN port without any layer 2 or 3 processing, and likewise data received on the second VLAN port is directly transmitted on the first VLAN port without any layer 2 or 3 processing). In this manner, CE router 204 and LAN router 206 can continue to communicate with each other using the first VLAN (VLAN tag 50) if network device 202 fails.

Figure 3:
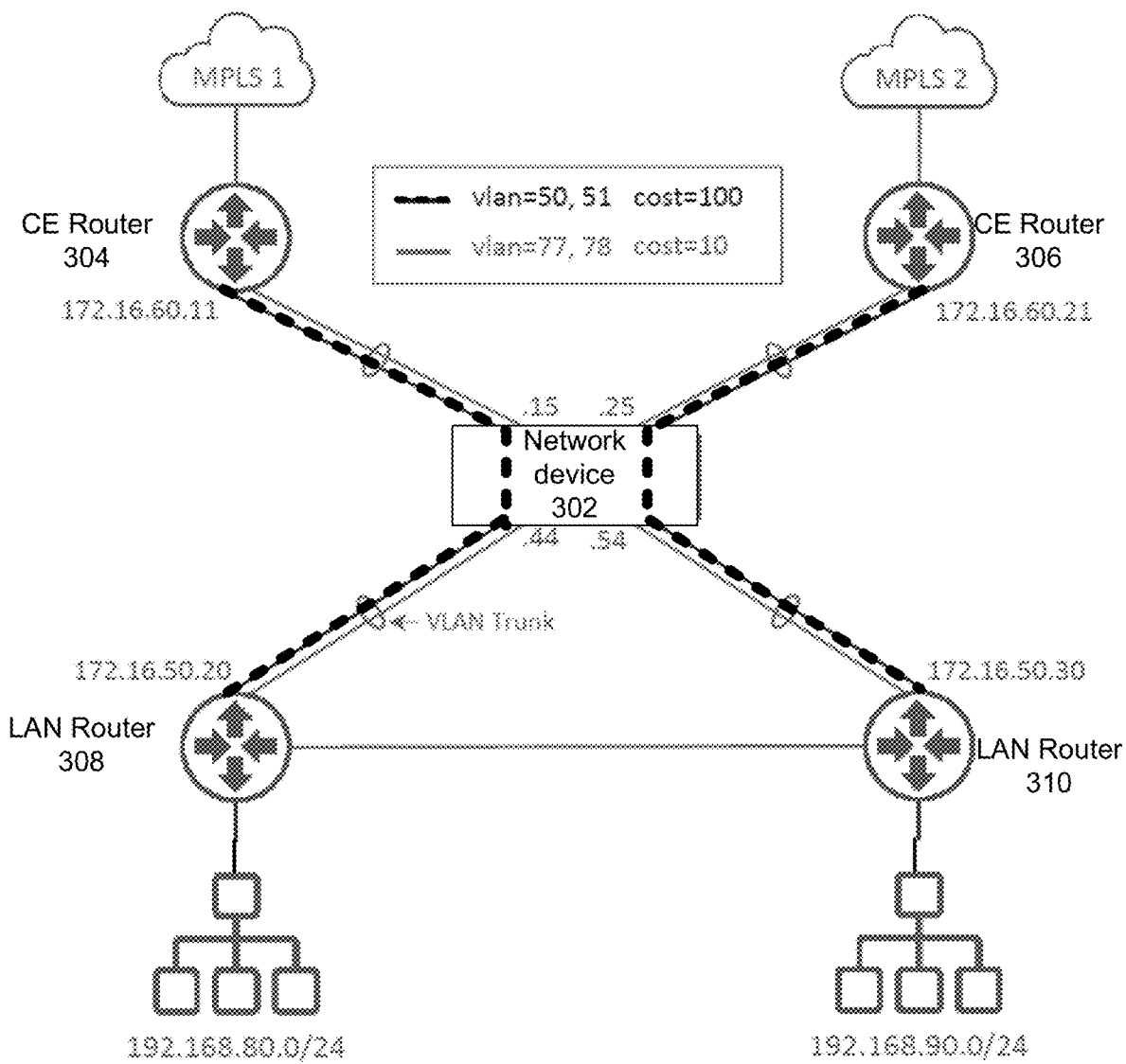
FIG. 3 illustrates a HA network device in accordance with some embodiments described herein.

FIG. 3 illustrates a HA network device in accordance with some embodiments described herein. The network shown in FIG. 3 includes two CE routers and two LAN routers, but the operation of the network device is similar to that of FIG. 2. Network device 302 is coupled with CE routers 304 and 306 and LAN routers 308 and 310 using four VLAN trunk ports. VLAN tag 50 corresponds to a VLAN that includes CE router 304 and LAN router 308, and VLAN tag 51 corresponds to a VLAN that includes CE router 306 and LAN router 310. VLAN tag 77 corresponds to two VLANs (these two VLANs could have used different VLAN tags, but in the example shown in FIG. 3, they use the same tag): one that includes CE router 304 and network device 302, and another than includes LAN router 308 and network device 302. VLAN tag 78 corresponds to two VLANs (these two VLANs could have used different VLAN tags, but in the example shown in FIG. 3, they use the same tag): one that includes CE router 306 and network device 302, and another than includes LAN router 310 and network device 302.

These four VLANs are assigned cost metrics to cause network traffic to be routed through network device 302 under normal operating conditions, thereby enabling network device 302 to provide L3 routing capabilities. However, if a failure is detected in network device 302, then a fail-to-wire circuit in network device 302 causes a first physical bypass to be formed between the VLAN trunk ports that are connected to CE router 304 and LAN router 308, and a second physical bypass to be formed between the VLAN trunk ports that are connected to CE router 306 and LAN router 310. In this manner, the CE routers and the LAN routers can continue to communicate with each other using VLANs with tags 50 and 51 if network device 302 fails.

Figure 4A:
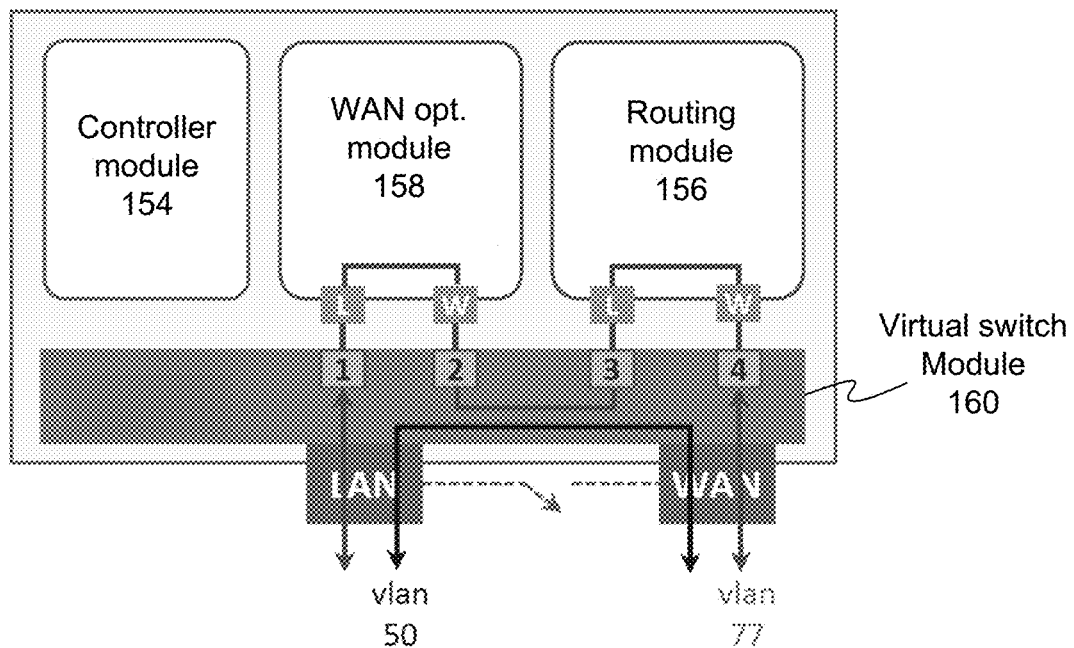
FIGS. 4A-4D illustrate a HA network device in accordance with some embodiments described herein.
Figure 4B:
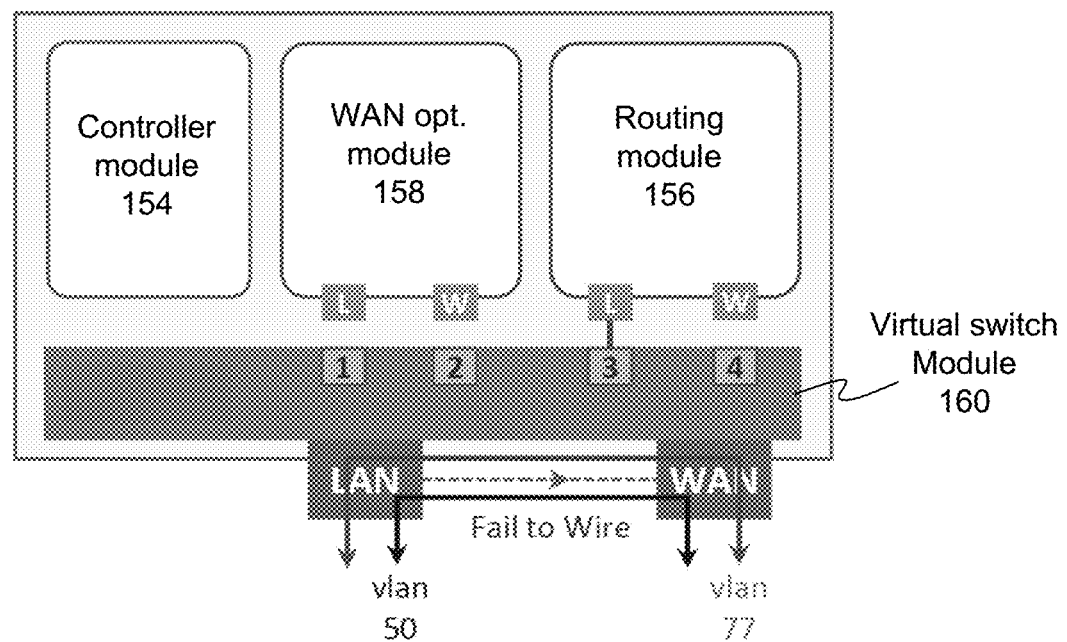
Figure 4C:
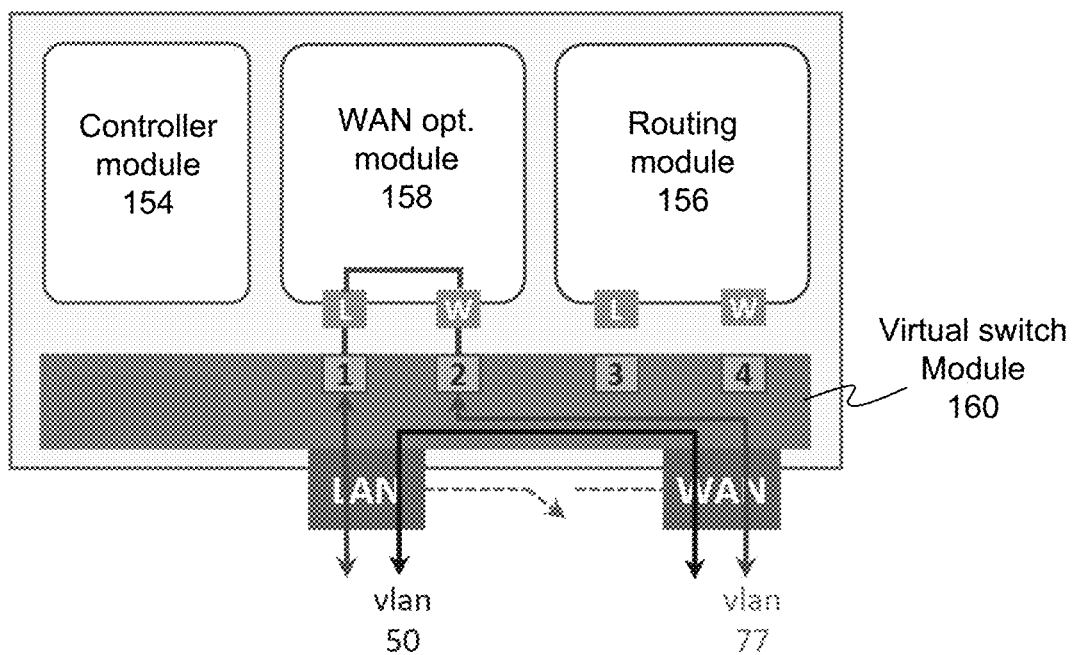
Figure 4D:
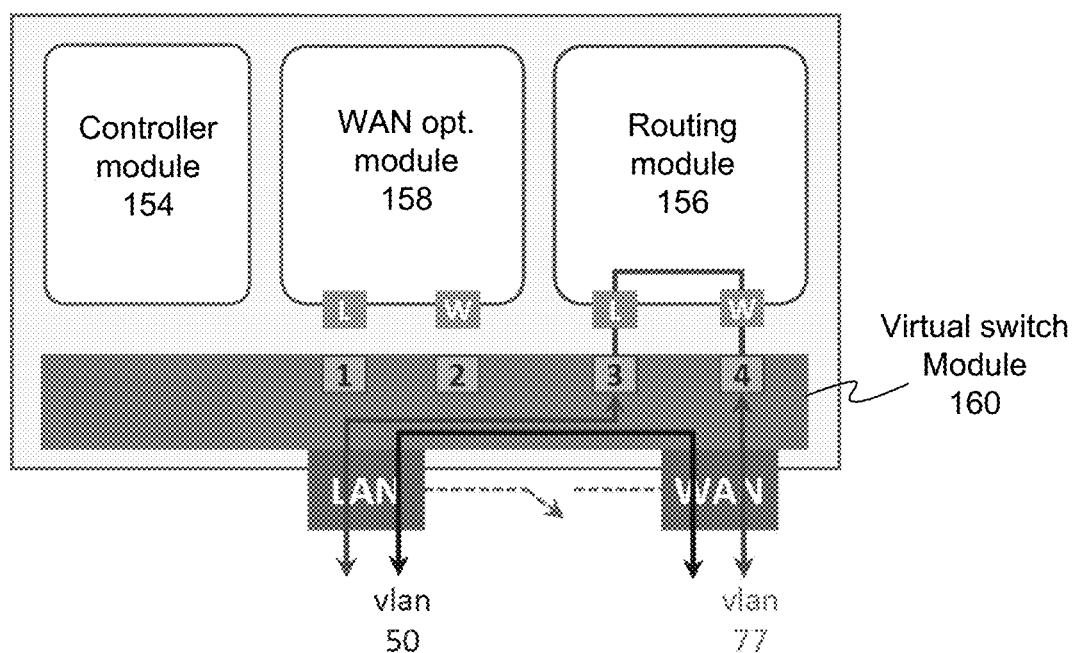

FIGS. 4A-4D illustrate a HA network device in accordance with some embodiments described herein. FIG. 4A illustrates normal operation when network traffic is received on VLAN tag 77, and is processed by the routing module 156 and the WAN optimization module 158. Virtual switch module 160 provides four virtual ports that are shown using numerals 1-4 in FIG. 4A. FIG. 4B illustrates how the fail-to-wire circuit in the network device directly communicates data between the two VLAN trunk ports (shown as "LAN" and "WAN" in FIG. 4B). FIG. 4C illustrates how, upon detecting a critical software failure in routing module 156, controller module 154 reconfigures virtual switch module 160 so that the network traffic is processed by the WAN optimization module 158, but not processed by failed routing module 156. FIG. 4D illustrates how, upon detecting a critical software failure in WAN optimization module 158, controller module 154 reconfigures virtual switch module 160 so that the network traffic is processed by the routing module 156, but not processed by failed WAN optimization module 158.

Figure 5:
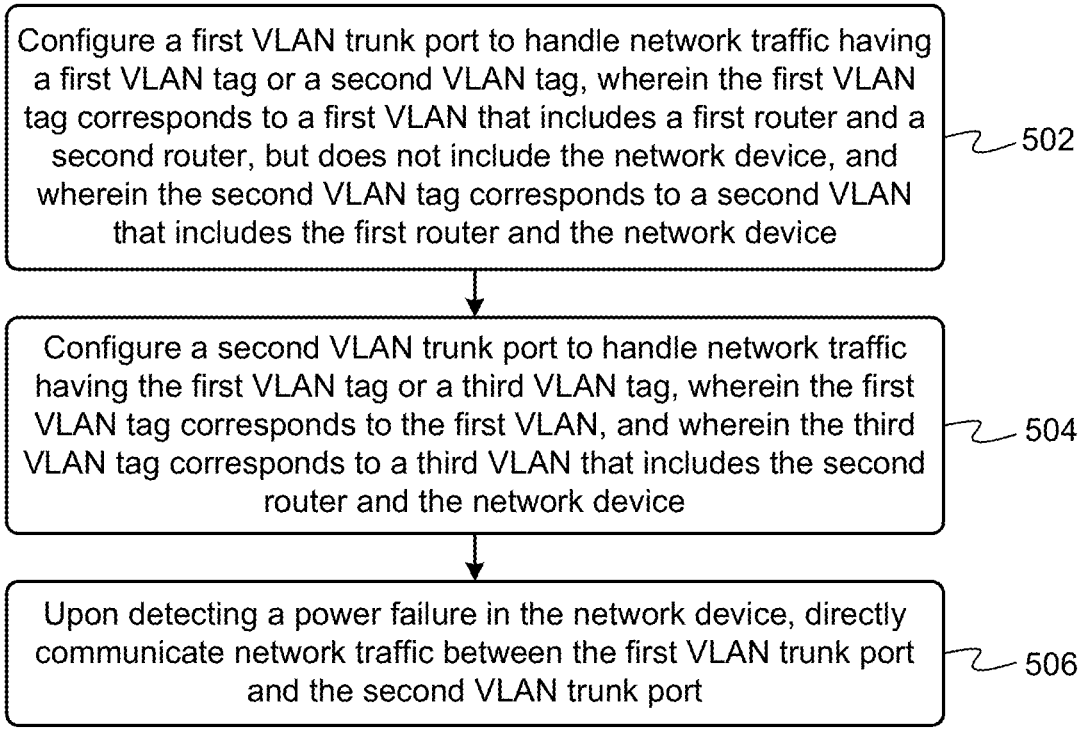
FIG. 5 illustrates a process for providing HA in a network device in accordance with some embodiments described herein.

FIG. 5 illustrates a method for providing HA in a network device in accordance with some embodiments described herein. The method can begin by configuring a first VLAN trunk port to handle network traffic having a first VLAN tag or a second VLAN tag, wherein the first VLAN tag corresponds to a first VLAN that includes a first router and a second router, but does not include the network device, and wherein the second VLAN tag corresponds to a second VLAN that includes the first router and the network device (step 502). The method can then configure a second VLAN trunk port to handle network traffic having the first VLAN tag or a third VLAN tag, wherein the first VLAN tag corresponds to the first VLAN, and wherein the third VLAN tag corresponds to a third VLAN that includes the second router and the network device (step 504). Next, upon detecting a power failure in the network device, the method can directly communicate network traffic between the first VLAN trunk port and the second VLAN trunk port (step 506). Specifically, in step 506, hardware relays can be used to implement fail-to-wire when power is removed.

In some embodiments, the process can also route the second VLAN network traffic and the third VLAN network traffic, optimize the second VLAN network traffic and the third VLAN network traffic, and detect critical software failures in the routing module and/or the WAN optimization module. The process can (1) bypass the routing module upon detecting the critical software failure in the routing module, (2) bypass the WAN optimization module upon detecting the critical software failure in the WAN optimization module, and/or (3) bypass the routing module and the WAN optimization module upon detecting critical software failures in the routing module and the WAN optimization module.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed.

Accordingly, many modifications and variations will be apparent to practitioners skilled in the art. Additionally, the above disclosure is not intended to limit the present invention. The scope of the present invention is defined by the appended claims.

What is claimed is:

1. A method for providing high availability in a network device that includes a first virtual local area network (VLAN) trunk port coupled to a first router and a second VLAN trunk port coupled to a second router, wherein the network device is a layer 3 next-hop for the first router and the second router, the method comprising:
    configuring, by a processor, the first VLAN trunk port to handle network traffic having a first VLAN tag or a second VLAN tag, wherein the first VLAN tag corresponds to a first VLAN that includes the first router and the second router, but does not include the network device, and wherein the second VLAN tag corresponds to a second VLAN that includes the first router and the network device;
    configuring the second VLAN trunk port to handle network traffic having the first VLAN tag or a third VLAN tag, wherein the first VLAN tag corresponds to the first VLAN, and wherein the third VLAN tag corresponds to a third VLAN that includes the second router and the network device;
    routing the second VLAN network traffic and the third VLAN network traffic;
    optimizing the second VLAN network traffic and the third VLAN network traffic; and
    upon detecting a power failure in the network device, directly communicating network traffic between the first VLAN trunk port and the second VLAN trunk port.

2. The method of claim 1, comprising detecting a critical software failure in a routing module, a WAN optimization module, or both routing module and the WAN optimization module.

3. The method of claim 2, comprising bypassing the routing module upon detecting the critical software failure in the routing module.

4. The method of claim 2, comprising bypassing the WAN optimization module upon detecting the critical software failure in the WAN optimization module.

5. The method of claim 2, comprising bypassing the routing module and the WAN optimization module upon detecting critical software failures in the routing module and the WAN optimization module.

6. A non-transitory computer-readable storage medium storing instructions that, when executed by a computer, cause the computer to perform a method for providing high availability in a network device that includes a first virtual local area network (VLAN) trunk port coupled to a first router and a second VLAN trunk port coupled to a second router, wherein the network device is a layer 3 next-hop for the first router and the second router, the method comprising:
    configuring the first VLAN trunk port to handle network traffic having a first VLAN tag or a second VLAN tag, wherein the first VLAN tag corresponds to a first VLAN that includes the first router and the second router, but does not include the network device, and wherein the second VLAN tag corresponds to a second VLAN that includes the first router and the network device;
    configuring the second VLAN trunk port to handle network traffic having the first VLAN tag or a third VLAN tag, wherein the first VLAN tag corresponds to the first VLAN, and wherein the third VLAN tag corresponds to a third VLAN that includes the second router and the network device;
    routing the second VLAN network traffic and the third VLAN network traffic;
    optimizing the second VLAN network traffic and the third VLAN network traffic; and
    upon detecting a power failure in the network device, directly communicating network traffic between the first VLAN trunk port and the second VLAN trunk port.

7. The non-transitory computer-readable storage medium of claim 6, wherein the method further comprises detecting a critical software failure in a routing module, a WAN optimization module, or both the routing module and the WAN optimization module.

8. The non-transitory computer-readable storage medium of claim 7, wherein the method further comprises bypassing the routing module upon detecting the critical software failure in the routing module.

9. The non-transitory computer-readable storage medium of claim 7, wherein the method further comprises bypassing the WAN optimization module upon detecting the critical software failure in the WAN optimization module.

10. The non-transitory computer-readable storage medium of claim 7, wherein the method further comprises bypassing the routing module and the WAN optimization module upon detecting critical software failures in the routing module and the WAN optimization module.

11. A network device, comprising:
    a first virtual local area network (VLAN) trunk port that is coupled to a first router;
    a second VLAN trunk port that is coupled to a second router;
    wherein the network device is a layer 3 next-hop for the first router and the second router;
    wherein the first VLAN trunk port handles traffic having a first VLAN tag or a second VLAN tag, wherein the first VLAN tag corresponds to a first VLAN that includes the first router and the second router, but does not include the network device, and wherein the second VLAN tag corresponds to a second VLAN that includes the first router and the network device;
    wherein the second VLAN trunk port handles traffic having the first VLAN tag or a third VLAN tag, wherein the first VLAN tag corresponds to the first VLAN, and wherein the third VLAN tag corresponds to a third VLAN that includes the second router and the network device;
    a fail-to-wire circuit to, upon detection of a power failure in the network device, directly communicating network traffic between the first VLAN trunk port and the second VLAN trunk port;
    a processor; and
    a non-transitory storage medium storing processor-executable instructions, comprising:
        a routing module to route the second VLAN network traffic and the third VLAN network traffic;
        a wide area network (WAN) optimization module to optimize the second VLAN network traffic and the third VLAN network traffic;
        a virtual switch module to provide virtual ports for communicating the second VLAN network traffic between different modules in the network device; and
        a controller module to (1) detect a critical software failure in the routing module, the WAN optimization module, or both the routing module and the WAN optimization module, and (2) configure the virtual switch module upon detecting the critical software failure.

12. The network device of claim 11, wherein the virtual switch module is configured so that the network traffic is processed by the routing module and the WAN optimization module during normal operation.

13. The network device of claim 12, wherein upon detecting the critical software failure in the routing module, the controller module configures the virtual switch module to bypass the routing module.

14. The network device of claim 12, wherein upon detecting the critical software failure in the WAN optimization module, the controller module configures the virtual switch module to bypass the WAN optimization module.

15. The network device of claim 12, wherein upon detecting critical software failures in both the routing module and the WAN optimization module, the controller module configures the virtual switch module to bypass the routing module and the WAN optimization module.

* * * * *